US010794218B2

(12) United States Patent
Bruhat et al.

(10) Patent No.: US 10,794,218 B2
(45) Date of Patent: Oct. 6, 2020

(54) DISCHARGE FLOW DUCT OF A TURBINE ENGINE COMPRISING A VBV GRATING WITH VARIABLE SETTING

(71) Applicant: Safran Aircraft Engines, Paris (FR)

(72) Inventors: Jean-Frederic Pierre Joseph Bruhat, Moissy-Cramayel (FR); Philippe Jacques Pierre Fessou, Moissy-Cramayel (FR); Benjamin Lukowski, Moissy-Cramayel (FR)

(73) Assignee: Safran Aircraft Engines, Paris (FR)

(*) Notice: Subject to any disclaimer, the term of this patent is extended or adjusted under 35 U.S.C. 154(b) by 302 days.

(21) Appl. No.: 15/563,359

(22) PCT Filed: Mar. 31, 2016

(86) PCT No.: PCT/FR2016/050716
§ 371 (c)(1),
(2) Date: Sep. 29, 2017

(87) PCT Pub. No.: WO2016/156739
PCT Pub. Date: Oct. 6, 2016

(65) Prior Publication Data
US 2018/0080337 A1 Mar. 22, 2018

(30) Foreign Application Priority Data
Apr. 1, 2015 (FR) ...................................... 15 52808

(51) Int. Cl.
*F03B 1/00* (2006.01)
*F01D 17/14* (2006.01)
*F02C 6/08* (2006.01)
*F02C 9/18* (2006.01)
*F02K 3/075* (2006.01)
(Continued)

(52) U.S. Cl.
CPC ............. *F01D 17/145* (2013.01); *F01D 9/02* (2013.01); *F01D 25/24* (2013.01); *F02C 6/08* (2013.01);
(Continued)

(58) Field of Classification Search
CPC .......... F01D 17/145; F01D 9/02; F01D 25/24; F02C 6/08; F02C 9/18; F02K 3/075;
(Continued)

(56) References Cited

U.S. PATENT DOCUMENTS 5,809,772 A * 9/1998 Giffin, III ............... F02K 3/075
60/226.1
7,730,714 B2 * 6/2010 Wood .................... F01D 17/162
60/226.1
(Continued)

FOREIGN PATENT DOCUMENTS

EP 2 431 591 A2 3/2012
EP 2 431 591 A3 3/2012
(Continued)

OTHER PUBLICATIONS

International Search Report dated Jul. 1, 2016, in PCT/FR2016/050716 filed Mar. 31, 2016.
(Continued)

*Primary Examiner* — Hung Q Nguyen
*Assistant Examiner* — Anthony Donald Taylor, Jr.
(74) *Attorney, Agent, or Firm* — Oblon, McClelland, Maier & Neustadt, L.L.P.

(57) ABSTRACT

A hub of an intermediate casing for a dual-flow turbine engine includes a discharge flow duct extending between an inner shroud and an outer shroud of the hub, the discharge flow duct leading into the secondary flow space through an outlet opening formed in the outer shroud, the outlet opening included in a discharge plane substantially tangential to the outer shroud; and discharge fins including an upstream fin and a downstream fin. An upstream acute angle between the discharge plane and the skeleton line of the upstream fin is smaller than a downstream acute angle between the discharge plane and the skeleton line of the downstream fin.

14 Claims, 3 Drawing Sheets

(51) Int. Cl.
  *F01D 9/02* (2006.01)
  *F01D 25/24* (2006.01)
(52) U.S. Cl.
  CPC .............. *F02C 9/18* (2013.01); *F02K 3/075* (2013.01); *F05D 2220/30* (2013.01); *F05D 2240/12* (2013.01); *F05D 2240/126* (2013.01); *F05D 2240/129* (2013.01); *F05D 2260/605* (2013.01); *F05D 2260/606* (2013.01); *F05D 2270/101* (2013.01)
(58) Field of Classification Search
  CPC ............. F05D 2220/30; F05D 2240/12; F05D 2240/126; F05D 2240/129; F05D 2260/605; F05D 2260/606; F05D 2270/101
  USPC ........................................................ 415/208
  See application file for complete search history.

(56) References Cited

U.S. PATENT DOCUMENTS

| | | | |
|---|---|---|---|
| 9,194,331 B2* | 11/2015 | Feldmann | F01D 11/24 |
| 10,018,121 B2* | 7/2018 | Taylor-Tibbott | F01D 17/105 |
| 2006/0277919 A1* | 12/2006 | Martensson | F02K 3/075 60/785 |
| 2010/0180573 A1* | 7/2010 | Ruston | F02K 3/075 60/226.3 |
| 2012/0067061 A1* | 3/2012 | Wright | F16F 5/00 60/785 |
| 2013/0269366 A1* | 10/2013 | Haugen | F02C 6/08 60/783 |
| 2014/0245747 A1* | 9/2014 | Pritchard, Jr. | F01D 17/105 60/782 |
| 2015/0275757 A1* | 10/2015 | Turner | B64D 33/02 415/1 |

FOREIGN PATENT DOCUMENTS

| EP | 2 653 699 A2 | 10/2013 |
|---|---|---|
| WO | WO 2014/051673 A1 | 4/2014 |

OTHER PUBLICATIONS

Search Report and Written Opinion dated Feb. 16, 2016 in corresponding French Patent Application No. 1552808 (with English Translation of Category of Cited Documents) 8 pages.

* cited by examiner

DISCHARGE FLOW DUCT OF A TURBINE ENGINE COMPRISING A VBV GRATING WITH VARIABLE SETTING

FIELD OF THE INVENTION

The invention relates to the general field of dual flow turbine engines, and more particularly to discharge valves allowing regulation of the air at the outlet of a compressor of such a turbine engine, said valves sometimes being designated by their acronym VBV (for variable bleed valves).

TECHNOLOGICAL BACKGROUND

A dual flow turbine engine generally comprises, from upstream to downstream in the gas flow direction, a ducted fan, an annular primary flow space, and an annular secondary flow space. The mass of air aspirated by the fan is therefore divided into a primary flow, which circulates in the primary flow space, and a secondary flow, which is concentric with the primary flow and circulates in the secondary flow space.

The primary flow space runs through a primary body comprising one or more compressor stages, for example a low-pressure compressor and a high-pressure compressor, one or more turbine stages, for example a high-pressure turbine and a low-pressure turbine, and a gas exhaust nozzle.

In a manner known per se, the turbine engine also comprises an intermediate casing, the hub whereof is arranged between the low-pressure compressor casing and the high-pressure compressor casing. The intermediate casing comprises discharge valves or VBVs, the role whereof is to regulate the flow rate at the inlet of the high pressure compressor so as in particular to limit the risks of hunting by the low-pressure compressor by discharging a portion of the air outside the primary flow space.

As illustrated in FIG. 1, which is a partial axis section view of a two-spool, dual flow airplane turbojet of a known type, the hubs 2 of the intermediate casings customarily comprising two coaxial annular shrouds, respectively inner 3 and outer 5, mutually connected by an upstream transverse flange 7 and by a downstream transverse flange 9.

The upstream flange 7 is arranged downstream of the low-pressure compressor while the downstream flange 9 is arranged upstream of the high-pressure compressor.

The inner shroud 3 delimits externally the primary flow space 10 of the primary flow of the turbine engine and comprises air intake openings 4 distributed circumferentially around an axis X of the inner shroud 3 (which is coaxial with the hub 2), which are closed by a corresponding discharge valve 12 designed for regulating the flow rate of the high-pressure compressor.

Such a discharge valve 12 can take the form of a door which is mounted pivotally on the inner shroud 3 between a closed position, wherein the door 12 closes the corresponding inlet opening 4 and is flush with the inner shroud 3 of the intermediate casing 1 while forming a substantially continuous surface for reducing as well as possible the risks of aerodynamic disturbances of the primary flow, and an open position (see FIG. 1) wherein the door 12 protrudes radially toward the interior with respect to the inner shroud 3 and thus allows the withdrawal of a portion of the primary flow in the primary flow space 10.

The outer shroud 5 delimits internally, for its part, the secondary flow space 14 of the secondary flow of the turbine engine, and comprises outlet openings 6 arranged downstream of the downstream transverse flange 9 and distributed circumferentially around the axis X of the outer shroud 5 (which is coaxial with the hub 2).

When the flow rate of air entering the high-pressure compressor is reduced, a surplus of air in the secondary flow space 14 can then be vented through these outlet openings 6, thus avoiding hunting phenomena which can lead to deterioration, or even complete destruction of the low-pressure compressor.

The turbine engine also comprises discharge streams, formed between the inlet openings 4 and the outlet openings 6. Each discharge stream is delimited, from upstream to downstream, between an inlet opening 4 and an associated outlet opening 6, by an annular space 16, delimited by the shrouds 3, 5 and the transverse flanges 7, 9, then by a discharge stream duct 18 (also known under the acronym kit engine), configured to guide the flow of gas until the secondary flow space 14. The discharge stream duct 18 thus comprises an intermediate opening 19, which leads into the intermediate space 16 at the upstream surface of the downstream transverse flange 9.

The doors 12, the intermediate spaces 16 and the associated discharge stream ducts 18 thus form together a system for venting air toward the secondary flow space 14 of the turbine engine.

The hub 2 of the intermediate casing 1 thus comprises a plurality of such systems distributed around its axis X.

Moreover, when a door 12 of a discharge valve is in the open position, a flow of gas scooped thereby runs through the intermediate space 16, the corresponding discharge stream duct 18, then reaches the secondary flow space 14 by means of a venting grating comprising fins 20, or VBV grating. The discharge streams and the fins 20 of the VBV gratings are inclined with respect to the direction of the secondary flow, so as to re-direct the gas flow F18 coming from the primary flow space and align it as well as possible with that of the secondary flow.

The applicant, however, noted that the introduction of the gas flow F18 coming from the primary flow space 10 into the secondary flow space 14 caused separation and flow recirculation problems, which had a tendency to reduce the extraction flow rate.

SUMMARY OF THE INVENTION

One objective of the invention is therefore to improve the extraction flow rate of the discharge valves of a dual flow turbine engine and to reduce the risks of separation or of flow recirculation in the secondary stream of the turbine engine.

To this end, the invention proposes an intermediate casing hub for a dual flow turbine engine, said hub comprising:

an inner shroud configured to delimit a primary flow space of the primary gas flow of the turbine engine, an outer shroud configured to delimit a secondary flow space of the secondary gas of said turbine engine, a discharge stream duct, extending between the inner shroud and the outer shroud, the discharge stream duct leading into the secondary flow space through an outlet opening formed in the outer shroud, said outlet opening being comprised in a discharge plane substantially tangent to the outer shroud, and discharge fins, attached in the discharge stream duct at the outlet opening of the outer shroud.

Moreover, the discharge fins comprise, from upstream to downstream in the gas flow direction in the secondary flow space, an upstream fin, which extends adjacently to an upstream wall of the discharge stream duct and which comprises a leading edge arranged facing a gas flow in the discharge stream duct and an upper surface wall, and a downstream fin, which extends adjacently to a downstream wall of the discharge stream duct and which comprises a leading edge and an upper surface wall.

Moreover, an acute upstream angle between the discharge plane and a tangent to the skeleton line at the leading edge of the upstream fin is different, and preferably smaller, than a downstream acute angle between the discharge plane and a tangent to the skeleton line at the leading edge of the downstream fin.

Certain preferred but not limiting features of the hub described above are the following, taken individually or in combination:

the upstream acute angle is smaller than the downstream acute angle, the upstream acute angle is substantially equal to an acute angle between the upstream wall of the discharge stream duct and the discharge plane, the upstream acute angle is comprised between 30° and 44°, preferably between 33° and 35°, 34° for example, the downstream acute angle is substantially equal to an acute angle defined between the downstream wall of the discharge stream duct and the discharge plane, the downstream acute angle is comprised between 40° and 50°, preferably between 43° and 45°, 44° for example, the discharge fins further comprise an supplementary fin comprising a leading edge and a trailing edge, said supplementary fin extending between the upstream fin and the downstream fin, and wherein an acute angle between the discharge plane and a tangent to the skeleton line at the leading edge of the supplementary fin is comprised between the downstream acute angle and the upstream acute angle, and/or the discharge fins comprise n supplementary fins each comprising a leading edge and a skeleton line and distributed at regular intervals between the upstream fin and the downstream fin, a downstream acute angle between the discharge plane and a tangent to the skeleton line at the leading edge of the ch supplementary fin being equal to:

$$\alpha_{i\_min} = i \frac{(\alpha_{downstream} - \alpha_{upstream})}{n+1} + \alpha_{upstream}$$

where:

$\alpha_{i\_min}$ is the minimum acute angle of the $i^{th}$ supplementary fin $\alpha_{upstream}$ is the upstream acute angle $\alpha_{downstream}$ is the downstream acute angle, the discharge fins have a curved skeleton line, the discharge fins further have a trailing edge, opposite to the leading edge, and wherein an angle between a tangent to the skeleton line at the trailing edge of the fins and the discharge plane is equal to an average between an average acute angle of the gas flow in the discharge stream duct with respect to the discharge plane and an angle between a flow direction of the secondary flow at the outlet opening with respect to the discharge plane:

$$\beta_{BF} = \frac{\gamma + \delta}{2}$$

where:

$\beta_{BF}$ is the angle at the trailing edge $\delta$ is the average flow angle in the discharge stream duct with respect to the discharge plane, and $\gamma$ is the angle of the secondary stream with respect to the discharge plane.

According to a second aspect, the invention also proposes an intermediate casing for a dual flow turbine engine comprising an intermediate casing hub as described above.

BRIEF DESCRIPTION OF THE DRAWINGS

Other features, goals and advantages of the present invention will appear more clearly upon reading the detailed description that follows, and with reference to the appended drawings given by way of nonlimiting examples wherein.

DETAILED DESCRIPTION OF AN EMBODIMENT

Figure 1:
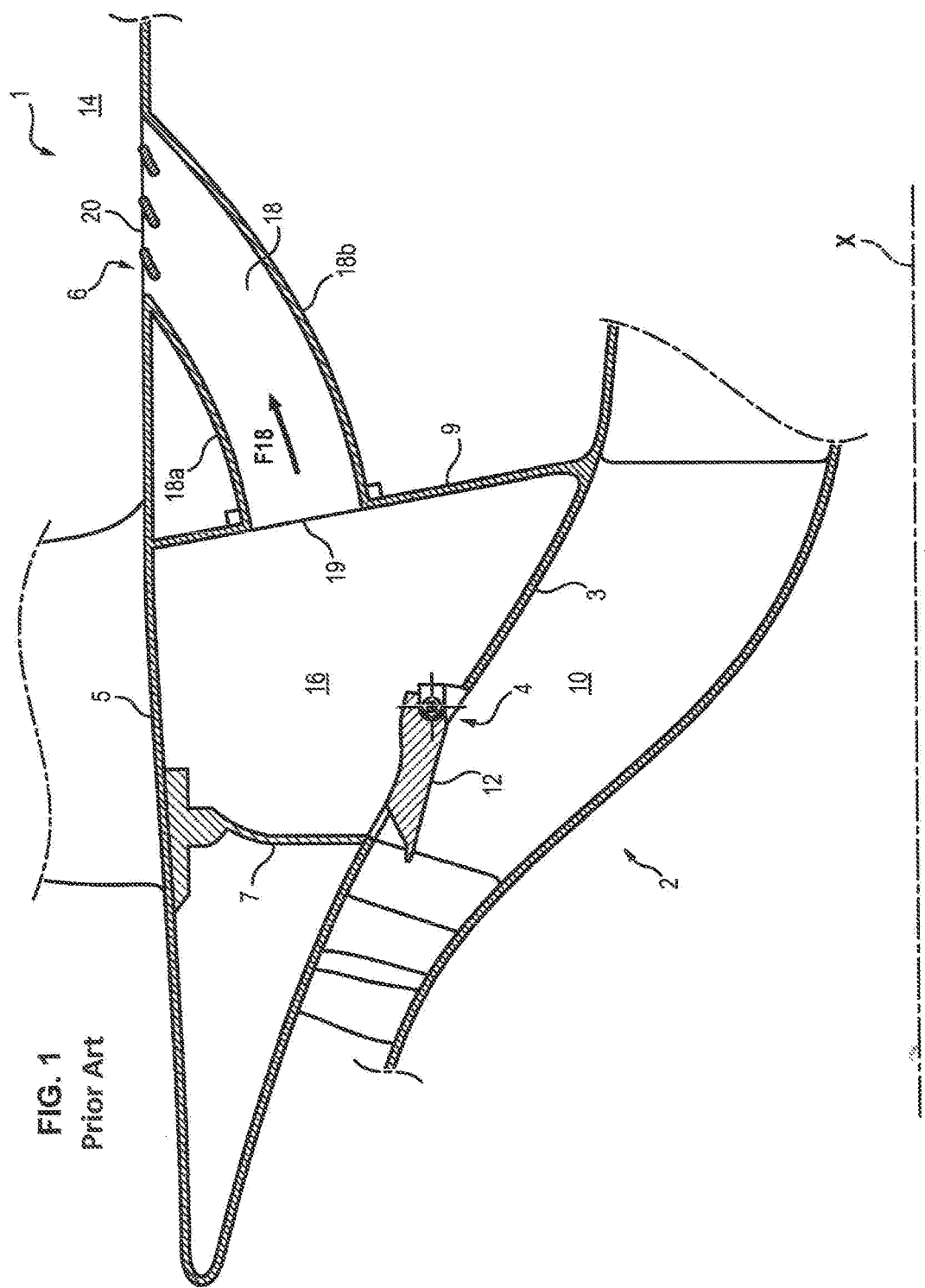
FIG. 1, which has been described above, is an axial section view of a hub for the intermediate casing known from the prior art.

Hereafter, a hub 2 of an intermediate casing for a dual-flow turbine engine and an associated intermediate casing will now be described with reference to the appended figures.

The hub 2 parts for the intermediate casing of the prior art, already described, are also present in the embodiments hereafter.

In particular, a hub 2 of an intermediate casing according to the invention comprises:

an inner shroud 3 configured to delimit a primary flow space 10 of the primary gas flow of the turbine engine, an outer shroud 5 configured to delimit a secondary flow space 14 of the secondary gas flow of said turbine engine, and at least one discharge stream duct 18, extending between the inner shroud 3 and the outer shroud 5.

The inner shroud 3 and the outer shroud 5 are coaxial with the axis X of the hub 2.

The discharge stream duct 18 leads into the primary flow space 10 through an inlet opening 4 formed in the inner shroud 3 and into the secondary flow space 14 through an outlet opening 6 formed in the outer shroud 5. Preferably, casing hub 2 comprises a plurality of discharge stream ducts 18, uniformly distributed between the inner shroud 3 and the outer shroud 5.

The inlet opening 4, which is formed in the inner shroud 3 of the hub 2, can be selectively opened or closed by a door 12 depending on the phases of flight of the turbine engine. Preferably, the door 12 is movable between a closed position, wherein the door 12 closes the inlet opening 4, and an open position wherein the door 12 releases the inlet opening 4. For example, the door 12 can be mounted hinged to the inner shroud 3 or comprise a sliding trap door.

The discharge stream duct 18 also comprises an upstream wall 18a and a downstream wall 18b, which extend between the intermediate space 16 and the outlet opening 6. The radially outward end of the upstream wall 18a is flush with the outer shroud 5, upstream of the outlet opening 6, while the radially outward end of the downstream wall 18b is flush with the outer shroud 5 downstream of said opening 6. The upstream wall 18a of the discharge stream duct 18 also delimits the radially outward portion of the duct 18, the downstream wall 18b delimiting its radially inward portion.

The hub 2 further comprises a VBV grating comprising a set of discharge fins 20 attached in the discharge stream duct 18 at the outlet opening 6, and configured to orient a discharge gas flow F18 coming from the primary flow space 10 and inject it into the secondary flow space 14 in a direction substantially parallel to that of the secondary flow F14, so as to reduce the head losses in the secondary flow space 14.

The discharge fins 20 comprise, from upstream to downstream in the gas flow direction in the secondary flow space 14, an upstream fin 22 and a downstream fin 24.

The upstream fin 22 and the downstream fin 24 each comprise a leading edge BA and a trailing edge BF, opposite to the leading edge BA. The leading edge BA of a fin 22, 24 corresponds to the anterior portion of its aerodynamic profile. It faces the gas flow F18 and divides the flow of air into a lower surface air flow and an upper surface air flow. For its part, the trailing edge BF corresponds to the posterior portion of the aerodynamic profile, where the lower surface and upper surface flows rejoin.

The upstream fin 22 and the downstream fin 24 further each have a lower surface wall I and an upper surface wall E, which connect the leading edge BA and the trailing edge BF and along which the lower surface and upper surface flows, respectively, pass.

The upstream fin 22 and the downstream fin 24 are adjacent to the upstream wall 18a and the downstream wall 18b, respectively. The upstream wall 18a and the downstream wall 18b generally do not extend in parallel into the zone adjacent to the outer shroud 5, as shown schematically in FIG. 2b. Moreover, the inclination of the upstream fin 22 in the discharge stream duct is different from that of the downstream fin 24, which allows a reduction in the risks of separation or of recirculation of the secondary flow F14 in the secondary stream.

More precisely, the upstream fin 22 and the downstream fin 24 are oriented in the discharge stream duct 18 so that the angle $\alpha_{upstream}$, called the upstream angle, between a discharge plane P and a tangent T to the skeleton line C at the leading edge BA of the upstream fin 22 is different from the angle, $\alpha_{downstream}$, called the downstream angle, between the discharge plane P and a tangent T to the skeleton line C at the leading edge BA of the downstream fin 24.

The skeleton line C is understood to be a fictitious line which comprises the set of points equidistant from the upper surface wall E and from the lower surface wall I of a given fin.

By discharge plane P is meant here a fictitious plane tangent to the outer shroud 5 at the outlet opening 6. The discharge plane P therefore intersects the upstream wall 18a and the downstream wall 18b and comprises the outlet cross-section of the discharge stream.

Figure 2A:
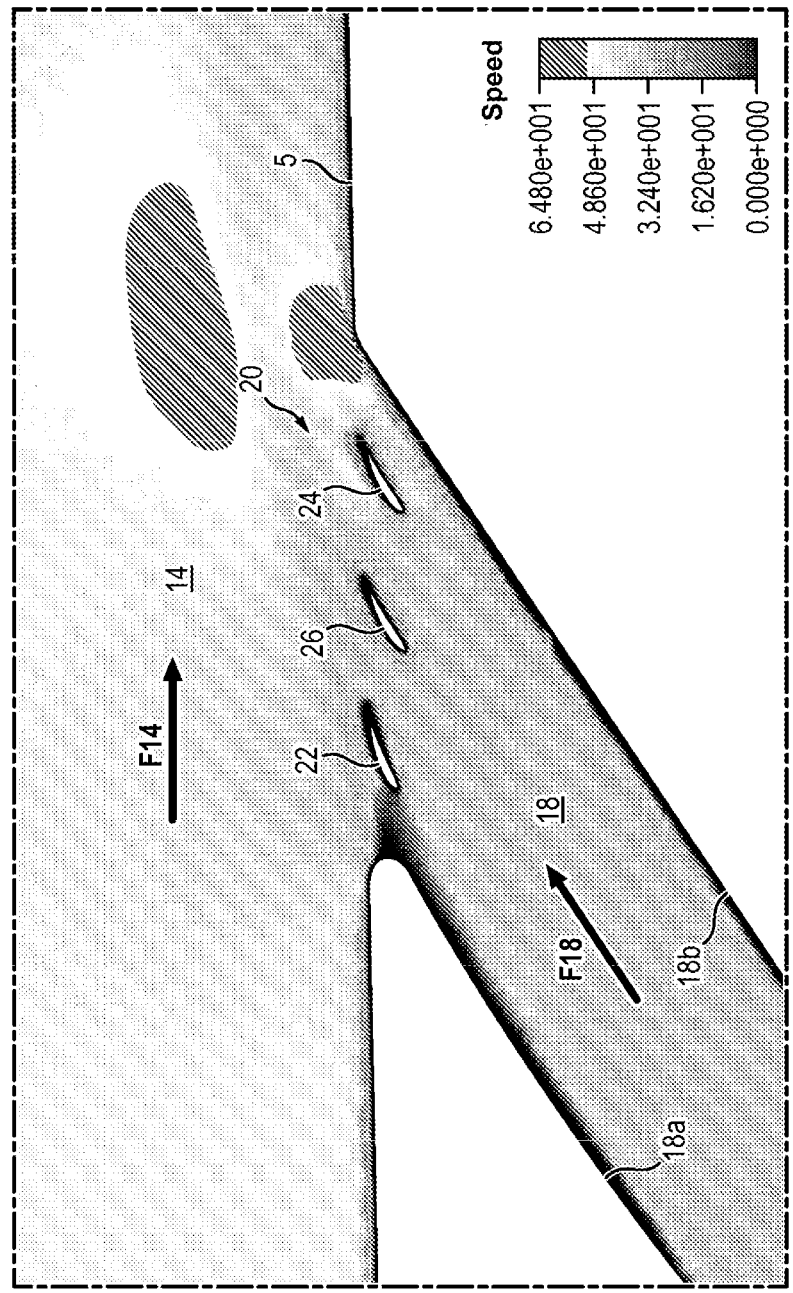
FIG. 2a illustrates an embodiment of a discharge stream duct of the intermediate casing according to the invention.
Figure 2B:
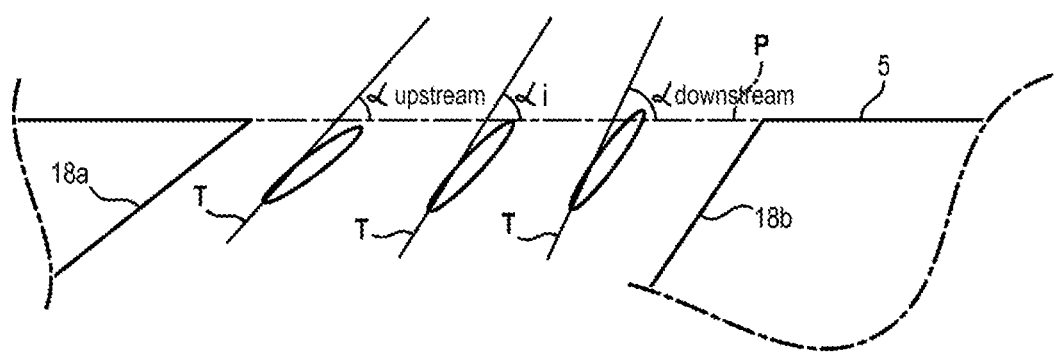
FIG. 2b is a schematic view of an exemplary embodiment of a discharge stream duct of a hub of an intermediate casing according to the invention.
Figure 3:
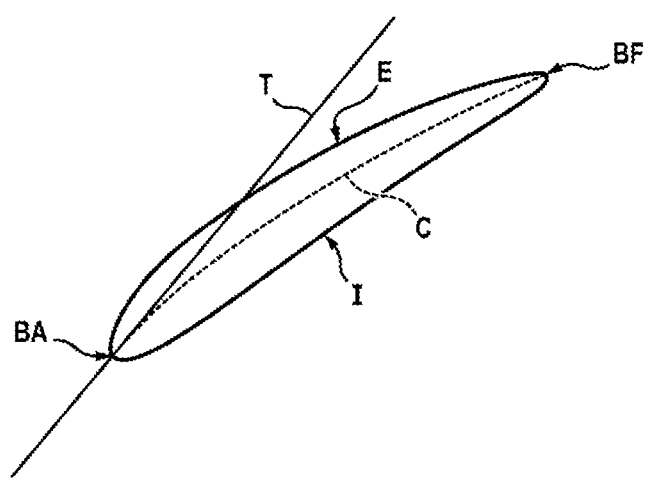
FIG. 3 is a schematic section view of an exemplary embodiment of a discharge fin which can be used in the invention.

The upstream $\alpha_{upstream}$ and downstream $\alpha_{downstream}$ angles have been illustrated in FIG. 2b by way of indication. These angles are acute so as to orient the flow F18 coming from the discharge stream duct 18 and align it with the secondary flow F14.

It will be noted that the upstream $\alpha_{upstream}$ and downstream $\alpha_{downstream}$ angles correspond to the angle of incidence of the fluid, that is the angle at which the gas flow F18 in the discharge stream duct 18 sees the corresponding fin 22, 24. Yet, the flow direction of the gas flow F18 in the duct 18 is not constant between the upstream wall 18a and the downstream wall 18b, due in particular to the inclination of the discharge stream duct 18 with respect to the flow direction of the primary flow and the relative inclination of the upstream 18a and downstream 18b walls: that is why the adaptation of the angle of incidence of the fins 22, 24 depending on their position in the discharge stream duct 18 allows a reduction in the risks of separation by locally modifying the angle of the flow F18 in the zone of the fins 22, 24 so that it is as close as possible to the flow angle F14, which allows the aerodynamic losses to be limited.

The Applicants have noted, in particular, that the local orientation of the gas flow F18 at the outlet opening 6 was more inclined at the downstream wall 18b than at the upstream wall 18a. The upstream acute angle $\alpha_{upstream}$ is therefore preferably smaller than the downstream acute angle $\alpha_{downstream}$. Such an orientation of the upstream fin 22 and of the downstream fin 24 thus allows an improvement in the circulation of the gas flow F18 at the VBV grating, and in particular at the upstream fin 22, but also allows the best deflection of the gas flow F18 prior to its entry into the secondary flow space 14 so as to limit aerodynamic losses.

In one embodiment, the upstream angle $\alpha_{upstream}$ and the downstream angle $\alpha_{downstream}$, are selected near the inclination angles of the upstream wall 18a and the downstream wall 18b, respectively, with respect to the discharge plane P.

The upstream acute angle $\alpha_{upstream}$ can for example be comprised between 30° and 44°, preferably between 33° and 35°, 35° for example.

The downstream acute angle $\alpha_{downstream}$ can, for its part, be comprised between 40° and 50°, preferably between 43° and 45°, 44° for example.

The discharge fins 20 can further comprise supplementary fins 26, extending between the upstream fin 22 and the downstream fin 24. The appended FIGS. 2a and 2b illustrate for example a VBV grating comprising three discharge fins 22, 24, 26.

These supplementary fins 26 then also each comprise a leading edge BA, a trailing edge BF and lower I and upper E surface walls.

For each of the supplementary fins 26, the angle $\alpha_i$ between the discharge plane P and the tangent T to the skeleton line C at the leading edge BA of the supplementary fin 26 is preferably comprised between the upstream angle $\alpha_{upstream}$ upstream and the downstream angle $\alpha_{downstream}$.

According to a first embodiment, the angle $\alpha_i$ can be substantially equal to the downstream angle $\alpha_{downstream}$. The Applicant has in fact noted that the reduction of the upstream angle $\alpha_{upstream}$ with respect to the downstream angle $\alpha_{downstream}$ already allowed a strong reduction in the separations of the flow F18 during its introduction into the flow 14.

According to a second embodiment, the angle $\alpha_i$ can be comprised between the upstream angle $\alpha_{upstream}$ and the downstream angle $\alpha_{downstream}$. For example, the angle $\alpha_i$ of the fins can be progressively inclined between the downstream angle $\alpha_{downstream}$ and the upstream angle $\alpha_{upstream}$, depending on the position of each supplementary fin 26 between the downstream wall 18b and the upstream wall 18a, which allows taking into account the progressive inclination of the gas flow F18 in the discharge stream duct between the downstream wall 18b and the upstream wall 18a.

In the exemplary embodiment illustrated in FIGS. 2a and 2b, the duct 18 comprises three discharge fins 20: one upstream fin 22, one downstream fin 24 and a supplementary fin 26, located halfway between the upstream fin 22 and the downstream fin 24. The angle $\alpha_i$ is then preferably comprised between the downstream angle $\alpha_{downstream}$ and the upstream angle $\alpha_{upstream}$. For example, for a downstream angle $\alpha_{downstream}$ of 44°, and an upstream angle $\alpha_{upstream}$ of 34°, the angle $\alpha_i$ can for example be comprised between 34° and 44°, typically 41°.

Generally, for a duct 18 comprising n supplementary fins 26 and therefore n+2 discharge fins 20, the angle $\alpha_i$ of the in supplementary fin 26 (the numbering of the supplementary fins 26 being accomplished from upstream to downstream in the gas flow direction in the secondary flow space, and i being comprised between 1 and n) can be comprised between downstream the angle $\alpha_{downstream}$ and a minimum angle $\alpha_{i\_min}$ such that:

$$\alpha_{i\_min} = i\frac{(\alpha_{downstream} - \alpha_{upstream})}{n+1} + \alpha_{upstream}$$

where:
$\alpha_{i\_min}$ is the minimum acute angle of the supplementary fin 26
$\alpha_{upstream}$ is the upstream acute angle
$\alpha_{downstream}$ is the downstream acute angle.

Thus, for a duct 18 comprising four discharge fins 20 with an upstream angle of 20° a downstream angle of 50°, an angle $\alpha_{1min}$ of 30° is obtained for the $1^{st}$ supplementary fin 26 and an angle $\alpha_{2min}$ of 40° for the $2^{nd}$ supplementary fin 26.

Such an orientation also allows each supplementary fin 26 to be individually oriented depending on the local angle of incidence of the gas flow F18 in the discharge stream duct 18.

The discharge fins 20 can be straight, that is have a lower surface wall I and an upper surface wall E that are substantially flat and parallel.

As a variant, the discharge fins 20 can have a curved skeleton line C, so as to improve the deflection of the gas flow F18 coming from the primary flow space, to align it with the secondary flow F14.

For example, for a given fin 22, 24, 26 of the VBV grating, the angle $\beta_{BFi}$ between the tangent T to the skeleton line C at the trailing edge BF of the fin 22, 24, 26 and the discharge plane P can be equal to the average of the local flow angle $\delta_i$ (at the fin under consideration) of the gas flow F18 in the discharge stream duct 18 with respect to the discharge plane P and the angle $\gamma$ between the flow direction of the secondary stream and the discharge plane P, at the outlet opening 6.

Thus, the angle $\beta_{BFi}$ of a given fin 20 can be defined as follows:

$$\beta_{BFi} = \frac{\delta_i + \gamma}{2}$$

One then obtains, for each fin 22, 24, 26, a specific curved skeleton line C.

Alternatively, the discharge fins 20 of a given VBV grating can be identical, so as to simplify in particular the manufacture of the hub 2 and to reduce its manufacturing cost. To this end, no matter what the fin 22, 24, 26 of the VBV grating, an average angle $\delta$, corresponding to the average of the local flow angles of the gas flow F18 in the discharge stream duct 18, is determined, this angle then being used to determine the angle $\beta_{BF}$ for all the fins 20:

$$\beta_{BF} = \frac{\delta + \gamma}{2}$$

It will be noted that the average angle $\delta$, the local angle $\delta_i$ and the angle $\gamma$ of the direction of the secondary flow 14 are acute angles.

The average angle $\delta$ can for example be determined by averaging the local angles $\delta_i$. It will be understood, of course, that the measurement of the angles $\delta_i$ is carried out only when the discharge stream is delivering, that is when the turbine engine is in transient operation (mainly during takeoff and during landing) and that the door 12 is in the open position to collect a portion of the gas in the primary flow space 10. Yet, when the discharge stream is delivering, the flux of the gas flow F18 in the discharge stream duct 18 is substantially constant and reproducible: the determination of the local angles $\delta_i$ is therefore reproducible to some degree, to within 2°.

As a first approximation, the average angle S can be approximated by the average of the local angles at the upstream fin 22 and at the downstream fin 24.

One could in particular start with an aerodynamic profile of the NACA (acronym of National Advisory Committee on Aeronautics) type so as to dimension the discharge fins based on their angle $\beta_{BF1}$ or $\beta_{BF}$, a profile of the NACA54115 type for example.

The invention claimed is:
1. A hub for a dual-flow turbine engine, the hub comprising:
a first shroud defining a primary flow space for a primary gas flow of the dual-flow turbine engine,
a second shroud defining a secondary flow space for a secondary gas flow of the dual-flow turbine engine,
a discharge stream duct extending between the first shroud and the second shroud, the discharge stream duct defining a discharge flow space for a discharge gas flow, wherein a wall of the second shroud comprises an opening, the opening being an outlet for the discharge gas flow into the secondary flow space of the second shroud, such that a discharge plane of the discharge stream duct is coincident with the wall of the second shroud comprising the opening, and
an upstream fin and a downstream fin, both the upstream fin and the downstream fin disposed in the discharge stream duct at the opening, the downstream fin being downstream from the upstream fin relative to a direction of flow of the secondary gas flow in the secondary shroud, wherein:
the upstream fin is located adjacent to an upstream surface of the discharge stream duct relative to the direction of flow of the secondary gas flow in the secondary shroud, the upstream fin having a skeleton line, and a leading edge arranged facing the discharge gas flow in the discharge stream duct,
the downstream fin is located adjacent to a downstream surface of the discharge stream duct relative to the direction of flow of the secondary gas flow in the secondary shroud, the downstream fin having a respective skeleton line, and a leading edge arranged facing the discharge gas flow in the discharge stream duct, and an upstream acute angle ($\alpha_{upstream}$) between the discharge plane and a tangent to the skeleton line at the leading edge of the upstream fin is smaller than a downstream acute angle ($\alpha_{downstream}$) between the discharge plane and a tangent to the respective skeleton line at the leading edge of the downstream fin.

2. The hub according to claim 1, wherein the upstream acute angle ($\alpha_{upstream}$) is substantially equal to an acute angle defined between the upstream wall surface of the discharge stream duct and the discharge plane.

3. The hub according to claim 2, wherein the upstream acute angle ($\alpha_{upstream}$) is between 30° and 44°.

4. The hub according to claim 1, wherein the downstream acute angle ($\alpha_{downstream}$) is substantially equal to an acute angle defined between the downstream surface of the discharge stream duct and the discharge plane.

5. The hub according to claim 4, wherein the downstream acute angle ($\alpha_{downstream}$) is between 40° and 50°.

6. The hub according to claim 1, further comprising a supplementary fin comprising a leading edge, a trailing edge, and a skeleton line, the supplementary fin located between the upstream fin and the downstream fin in the discharge stream duct at the opening, and wherein an acute angle between the discharge plane and a tangent to the skeleton line at the leading edge of the supplementary fin is between the downstream acute angle ($\alpha_{downstream}$) and the upstream acute angle ($\alpha_{upstream}$).

7. The hub according to claim 1, further comprising a number n of supplementary fins, each supplementary fin having a leading edge and a skeleton line, wherein the supplementary fins are located and distributed at regular intervals between the upstream fin and the downstream fin, wherein a given supplementary fin is disposed at a minimum acute angle ($\alpha_{i\_min}$) between the discharge plane and a tangent to the skeleton line at the leading edge of the given supplementary fin being equal to:

$$\alpha_{i\_min} = i \frac{(\alpha_{downstream} - \alpha_{upstream})}{n+1} + \alpha_{upstream}$$

where:
$\alpha_{i\_min}$ is the minimum acute angle of the given supplementary fin, n is the number of supplementary fins,
i is a rank of the given supplementary fin relative to other supplementary fins, the rank increasing between the upstream fin and the downstream fin.
$\alpha_{upstream}$ is the upstream acute angle of the upstream fin, and
$\alpha_{downstream}$ is the downstream acute angle of the downstream fin.

8. The hub according claim 1, wherein the skeleton line of the upstream fin and the skeleton line of the downstream fin are curved skeleton lines.

9. The hub according to claim 8, wherein the upstream fin and the downstream fin further have a trailing edge opposite the leading edge, and wherein an angle ($\beta_{BF}$) between a tangent to the skeleton line at the trailing edge of the upstream and downstream fins and the discharge plane is equal to an average between an average acute angle ($\delta$) of the discharge gas flow in the discharge stream duct with respect to the discharge plane and an angle ($\gamma$) between the direction of flow of the secondary gas flow at the outlet opening with respect to the discharge plane:

$$\beta_{BF} = \frac{\gamma + \delta}{2}$$

where:
$\beta_{BF}$ is the angle at the trailing edge
$\delta$ is the average in acute angle, and
$\gamma$ is the angle between the direction of flow of the secondary gas flow at the outlet opening with respect to the discharge plane.

10. The hub according to claim 2, wherein the upstream acute angle ($\alpha_{upstream}$) is betweeen 33° and 35°.

11. The hub according to claim 2, wherein the upstream acute angle ($\alpha_{upstream}$) is 34°.

12. The hub according to claim 4, wherein the downstream acute angle ($\alpha_{downstream}$) is between 43° and 45°.

13. The hub according to claim 4, wherein the downstream acute angle ($\alpha_{downstream}$) 44°.

14. A turbine engine comprising the hub according to claim 1.

* * * * *